United States Patent Office 3,574,546
Patented Apr. 13, 1971

3,574,546
MANUFACTURE OF FINELY DIVIDED REFRACTORY OXIDES USING CONTROLLED AMOUNTS OF OXYGEN IN PLASMA JET REACTOR
Joseph Francis Skrivan, Stamford, Conn., assignor to American Cyanamid Company, Stamford, Conn.
No Drawing. Filed Aug. 17, 1965, Ser. No. 480,494
The portion of the term of the patent subsequent to Sept. 20, 1983, has been disclaimed
Int. Cl. C01g 1/02, 23/04
U.S. Cl. 23—202                                    8 Claims

ABSTRACT OF THE DISCLOSURE

This invention relates generally to an improved plasma jet process for making particulate oxides of refractory metals and metalloids. More particularly, it relates to an improvement in the high temperature plasma jet process for producing finely divided titanium oxide.

---

It is well-known to make refractory metal and metalloid oxides by various methods. One method used to produce titanium oxide but also applicable to other metal oxides by appropriate changes in reactants and conditions, involves the digestion of titaniferous ore material with sulfuric acid to produce titanium sulfate. This may be calcined, if it is desired to produce a pigment grade titanium dioxide. The product obtained from this method is $TiO_2$ of a wide range of particle sizes. It is often necessary to subject the product to further treatment if it is desired to improve its quality for pigment application.

Another known method of producing oxides such as silicon dioxide or titanium dioxide is to react the respective tetrachloride with oxygen at an elevated temperature. In this method, the reactants are brought to reaction temperaures by burning an intimately mixed gas such as carbon monoxide or methane. The by-products of burning which may be carbon dioxide or water are thus present during the tetrachloride-oxygen reaction, but, fortunately, they do not interfere with it. They do, however, have an impact on overall reaction efficiency. When carbon monoxide is burned as the heat source, it is converted to carbon dioxide. This gas contaminates the reactor effluent which has value for its chlorine content. Prior to recycling the chlorine to produce more $TiCl_4$ for burning, the carbon dioxide must be removed. This necessitates either a fractionation step with its cumbersome and expensive apparatus or some other separatory means. In any case, the burning of carbon monoxide increases the oxygen demand of the process, resulting in increased costs which are by no means insignificant. When water is produced as a by-product of the burning gas—this being the case when methane is burned—a different sort of problem arises. One of the products of the reaction between tetrachloride and oxygen, is chlorine. If water is not present, there is no reason why the chlorine cannot be collected and utilized. It is noteworthy that dry chlorine gas does not introduce corrosion problems of the same order of magnitude as in a chlorine system containing water. If water is present, chlorine reacts with it to produce hydrogen chloride, thus leading to the disadvantages of loss of valuable chlorine, introduction of a severe corrosion problem, and disposal requirements for hydrogen chloride.

Normally, oxide powders obtained from known oxidation processes such as those described above, tend to have a preponderance of large particles. For pigmentary, filling, weighting and reinforcing applications, it is desirable to have a higher and more uniform state of sub-division of the oxide powders. This objective can be accomplished by the addition to the reaction mixture of a significant amount of a material such as aluminum chloride which performs a nucleating function. While the contamination intentionally introduced for purposes of increasing nucleation is not normally too undesirable and can be tolerated, the addition of the nucleating agent involves an added production cost which is, of course, of critical concern in large-scale commercial operations.

More recently, a method has been disclosed which overcomes many of the disadvantages associated with known methods of producing finely divided oxides. It was found in accordance therewith that oxide powders, particularly titanium dioxide, could be produced without utilization of an auxiliary burning gas and with reduced or minimal amounts of nucleating agents by conducting the oxidation of a metal or metalloid salt with a plasma jet generator. In operating this method, a gas is passed through a high energy electric arc and the resulting plasma (the term "plasma" being employed generally herein to designate a very hot, partially ionized gas stream) is contacted with the material to be oxidized and oxygen. The plasma is thus the source of heat for raising the reactants to a temperature at which oxidation is initiated. No by-products of burning are introduced into the gas stream and, thus, problems above described as associated with the prior art methods are obviated. Moreover, in view of the much higher temperatures which are attainable by the plasma jet method, nucleation is much more general even without an added nucleating agent, which is perhaps due to the presence of electrically charged species in the plasma.

The general procedure employed in utilizing the plasma jet involves heating a gas such as nitrogen, argon, air, oxygen, etc., by means of an arc discharge to form a plasma stream. The reactants are brought into intimate contact with the plasma stream or streams in a manner such that the desired exothermic oxidation reaction is initiated. The resultant oxide product is secured by quenching the reactor effluent and entrapping by conventional means the precipitated oxide powder.

This method is useful for the production of any kind of refractory metal or metalloid oxide or mixtures of such oxides. The oxidizable starting material can be any inorganic metal or metalloid salt such as a halide (for example, a chloride or fluoride) or an oxyhalide (for example, the oxychloride). The metal or metalloid salts which can be converted are exemplified by silicon, titanium, aluminum, zirconium, iron and antimony compounds although not limited thereto. It is also feasible to use mixtures of such salts. Most important of the oxidizable compounds which can be converted by the plasma jet oxidation process are silicon tetrahalide and titanium tetrahalide. These materials give oxide powders which are widely used in pigment, rubber and paper applications. Aluminum oxides suitable for synthetic gem manufacture may also be produced by oxidation of the corresponding aluminum salt.

In plasma jet processes for production of metal and metalloid oxides, particle size can be controlled by using large excesses of oxygen over stoichiometry. In fact, the product is hardly commercially acceptable if an excess of gas is not used. The difficulty with using excess oxygen is that pure oxygen is rather expensive and its use adds to the cost of the product. Up to the present time, there has been no way to avoid this problem.

It is an object of the present invention to provide a plasma process for making metal and metalloid oxides by said process having reduced requirement for oxygen with substantially no sacrifice in product quality.

Another object of this invention is to provide fine particles of metal and metalloid by oxidation of salts in the plasma jet process using air or nitrogen in place of some or all of the excess oxygen requirement.

Other and further objects of this invention will become evident from the description and details of the invention set forth hereinafter.

According to this invention, it has been found that in the plasma process of oxidizing metal and metalloid salts with gaseous oxygen to give finely divided oxides, it is advantageous to use an oxygen containing reactant gas having about 100–105% of the stoichiometric requirement of oxygen, based on the salt and additionally about 10–150 volume percent (based on oxygen) of a gaseous diluent. Such oxygen containing streams are suitably obtained by combining oxygen and air in suitable proportions.

Preferably, a Y-type configuration reactor is preferably used. This apparatus is more completely described in copending application Ser. No. 430,262, filed Feb. 4, 1965, now U.S. 3,275,412 issued Sept. 27, 1966, and entitled "Chemical Product and Process." At least one of the reactants is separately admixed with a plasma stream. For example, a metal or metalloid salt can be admixed with one stream of heat-supplying plasma, and, if desired, the oxygen-containing gas can be separately admixed with another stream of heat-supplying plasma. The two streams, at least one of which has been heated by a plasma stream, are brought together after the salt and/or oxygen have sufficient combined enthalpy to bring the mixture of reactants to reaction temperature. If only one reactant is heated with a plasma stream, it must have sufficient excess heat to raise the ultimate reaction mixture to reaction temperature. If all reactants are heated to above reaction temperature, then compensation is not necessary and none of the reactants must be heated much above the temperature at which reaction is initiated.

For the purposes of this invention, it is desirable that reactant streams meet or converge at an angle with respect to each other, of between about 25° and 160°, to form the reaction mixture, which is caused to flow along the path offering the least frictional resistance and producing the minimal change of momentum. It is noteworthy that a converging angle of about 90° gives efficient and trouble-free operation for a long period. Use of equipment in which the angle is varied slightly from the preferred angle does not result in a significant change in efficiency of the reaction. When the angle at which the two reactant streams impinge goes much below 90°, i.e., in the range of 25°–50°, it is found that the reactant streams will not intermix properly before entering the reaction zone unless the streams are flowing together with sufficient momentum to assure turbulence. Thus, as a general rule, the smaller the angle of convergence, the higher should be the flow rate of the reactants. At these small angles, however, the problem of plugging is minimized and the particle size of the solid oxide product is generally smaller. If the angle of impingement is above 160°, efficiency of reaction is increased by reason of a higher order of mixing; but this increase in rate of reaction is accompanied by plugging problems. In view of the foregoing considerations, the preferred balance between high reaction and low plugging rates is obtained at practical reactant stream flow rates, when the angle of impingement of the two reactant streams is between 70° and 120°. Such an arrangement gives good mixing of the reactants without undue deposition of oxide particles on the walls of the reaction vessel.

The inert fluid used to form the plasma may be any gaseous material such as nitrogen, xenon, argon or helium. It is preferable that air is not used as the plasma heating the metal or metalloid salt. Either air or oxygen can be used to form the plasma used in heating the oxidizing gas.

Generally, the plasma should be heated to a temperature of about 3,000° C. to 12,000° C. prior to being admixed with the reactant. The quantity of reactant salt or salts which is admixed with a given amount of plasma depends, of course, on the desired reaction temperature and heat losses expected to occur before the reactants are admixed. In most operations, the quantity of plasma will be about 3–95% of the total gas mixture and preferably about 5–45% of the volume of the gas. The total volume of gases should be such that reactant streams flow together with turbulent mixing. It is understood that the inert gas used to form the plasma may be preheated by any practical means before being fed into the plasma generator and, likewise, the individual reactants may be preheated by such means as recycle of reaction zone effluents. Normally, such conventional heat exchange methods can raise either the reactants or the inert gas to temperatures of about up to 600° C.

The temperature at which the oxidation reaction is initiated will, of course, depend upon the particular salt which is being oxidized. Initiaton temperatures are well-known for such salts as the halides of aluminum, silicon, titanium, antimony and boron. The actual temperature to which the reactants are raised may be well above the initiation temperatures in order to hasten the rate of reaction and to reflect particle size requirements. The reaction temperature in the reaction zone for titanium dioxide is about 800° C. to 2,000° C. In general, the reaction mixture should remain in the zone of reaction for a period of at least 0.001 second and, practically speaking, the residence need not be longer than one second. More usually, a residence of about 0.02 to .1 second is adequate and will give the product in the desired particle size.

It is a particular feature of this invention that air is used to supply a part or all of the oxygen for oxidation of the metal or metalloid salts. It has been found that the control of particle size of the oxide can be achieved and maintained during the reaction by adjusting the amount of oxygen available. This is preferably done by use of air in place of pure oxygen. Decreased amounts of oxygen admixed with nitrogen can also be used. It is also possible to employ part of the off-gas from the reaction.

The amount of oxygen used will, in the first instance, be dependent upon the stoichiometry of the reaction. For practical results, at least a stoichiometric amount of oxygen should be present as based upon the salt being oxidized. It has in the past, been thought desirable to have an excess of oxygen available during the reaction. Excesses of 5 to 100% by volume have been recommended in the past. Using air, or other diluted oxygen mixtures, only the amount of air or such mixture required to give the stoichiometric amount of oxygen need be used. At most, an excess of 5% by volume of oxygen in the mixture is desirable to attain the benefits of the present invention. It is highly desirable to employ the dilution effect of the inert fluid, i.e. nitrogen, either pure, or as found in air, instead of, as in the past, using excess oxygen. It is also possible to use other inert gases such as recycled off-gas recovered from the reaction zone and freed of oxide product.

In the case of titanium dioxide where it may be desired to enhance the yield of the rutile crystalline form as against the anatase form, a small amount of aluminum chloride may be fed into the reactant stream with the titanium tetrachloride. The amount of aluminum chloride used for this purpose may vary over a wide range. In general, about 0.16 to 6.3% or, more preferably, 1.6 to 4.7% by weight of the product oxide should be employed. Advantageously, titanium dioxide pigment produced by this method (without aluminum chloride) is found to have a large proportion of particles in the optimum range of 0.17 to 0.22 micron.

A number of advantages are achieved by use of the herein described invention.

One advantage is that the metal or metalloid oxides produced using the aforesaid improvement have at least the equivalent fine, uniform particle size.

Another advantage is that inert gases such as nitrogen are economical and practical diluents which are just as effective as more costly pure oxygen in preventing coalescence of the fine oxide particles to unwanted agglomerates. Thus, a large proportion of the oxygen previously required to oxidize the salts and dilute the pigment particles can be replaced by air.

EXAMPLE 1

This example shows the product which is obtained when excess oxygen is used to dilute the reaction mixture.

Using a contacting section of Y configuration, in one arm 61.2 lbs./hr. of $TiCl_4$ vapor and 2.2 lbs./hr. of $AlCl_3$ vapor at 200° C. were mixed with 3 lbs./hr. of $N_2$ plasma containing 4800 B.t.u./lb. and in the other arm, 15.1 lb./hr. of $O_2$ at 25° C. were mixed with 3 lbs./hr. of $N_2$ plasma containing 4700 B.t.u./lb. The resultant hot streams containing $TiCl_4$ and $O_2$ were mixed and passed through an Inconel reactor 2" in diameter and 12" in length. The pigmentary $TiO_2$ formed in this reaction, at a calculated temperature of 1860° K. was evaluated at a tinting strength of 1630 and contained 93% rutile. The excess $O_2$ was 46%.

EXAMPLE 2

This example shows the use of air as a diluent for the reaction mixture.

In an experiment similar to Example 1, except that 5.7 lbs./hr. of the $O_2$ were replaced by an equivalent molar flow rate of air, the $TiO_2$ product was evaluated at a tinting strength of 1680 and contained 95% rutile. The excess $O_2$ was 3%.

EXAMPLE 3

This example shows the product which is obtained when oxygen is used as the diluent in the reaction zone.

In a similar experiment to Example 1, except for the use of a 17" long reaction zone, pigment having a tinting strength of 1720 was obtained with 95% rutile. The excess $O_2$ was 46%.

EXAMPLE 4

This example shows the product which can be obtained by the practice of the present invention.

In an experiment similar to Example 3, except that the excess $O_2$ was only 3%, the remaining dilution being air, a pigment having a tinting strength of 1720 was obtained with a 99% rutile content.

I claim:

1. In the process of continuously preparing finely divided refractory oxides from reactant oxygen and at least one reactant selected from the group consisting of vaporous salts of silicon, titanium, aluminum, zirconium, iron and antimony, wherein at least one of the reactant materials is admixed with a stream or gaseous fluid heated by means of a plasma generator to a temperature in the range of 3,000°–12,000° C., and the reactants are combined and passed into a reaction zone for a period of about 0.001 to 1.0 second to give the oxide product; the improvement which comprises using an oxygen-containing reactant stream consisting essentially of (a) 100–105% of the stoichiometric amount of oxygen based on the vaporous salt and (b) about 10–150%, based on oxygen, of a gaseous diluent which is inert under reaction conditions.

2. The process of claim 1 wherein the oxygen-containing reactant stream is diluted with 0.2–0.8 volume parts of air per volume part of oxygen.

3. The process of claim 1 wherein the streams of the two reactants are combined at an angle with respect to each other of 50°–160°.

4. The process of claim 1 wherein each reactant is separately admixed with gaseous fluid heated by means of a plasma generator prior to being combined with each other.

5. The process of claim 1 wherein the vaporous salt is titanium tetrachloride and the reactant oxygen is supplied as oxygen-enriched air.

6. The process of claim 1 wherein the gaseous fluid which is heated by means of the plasma generator is nitrogen.

7. The process of claim 5 wherein the oxygen-containing stream is oxygen diluted with 0.2–0.8 volume part of air per volume part of oxygen.

8. The process of claim 5 wherein the gaseous diluent is recycled oxide-free off-gas from the reaction zone.

References Cited

UNITED STATES PATENTS

| | | |
|---|---|---|
| 2,979,449 | 4/1961 | Sheer et al. |
| 3,069,281 | 12/1962 | Wilson. |
| 3,114,691 | 12/1963 | Case. |
| 3,120,427 | 2/1964 | Mas et al. |
| 3,275,412 | 9/1966 | Skrivan. |

OTHER REFERENCES

E. J. Hellund, "The Plasma State," pp. 89 and 95, The Reinhold Pub. Corp., New York (1961 ed.).

EDWARD STERN, Primary Examiner

U.S. Cl. X.R.

23—1, 139, 140, 142, 144, 149, 182, 200

UNITED STATES PATENT OFFICE
CERTIFICATE OF CORRECTION

Patent No. 3,574,546    Dated April 13, 1971

Inventor(s) Joseph Francis Skrivan

It is certified that error appears in the above-identified patent and that said Letters Patent are hereby corrected as shown below:

Column 6, line 1, after the word "stream", "or" should read --of--.

Signed and sealed this 6th day of July 1971.

(SEAL)
Attest:

EDWARD M. FLETCHER, JR.
Attesting Officer

WILLIAM E. SCHUYLE
Commissioner of Pa